Dec. 20, 1955     E. STEINER ET AL     2,728,036
ELECTRIC CONDENSERS

Filed Oct. 20, 1950     2 Sheets-Sheet 1

INVENTORS
ERNST STEINER
KORNELIUS NOSS &
KARL DAUNER

BY
ATTORNEY

Dec. 20, 1955  E. STEINER ET AL  2,728,036
ELECTRIC CONDENSERS
Filed Oct. 20, 1950  2 Sheets—Sheet 2

INVENTORS
ERNST STEINER
KORNELIUS NOSS &
KARL DAUNER
BY
ATTORNEY

United States Patent Office 2,728,036
Patented Dec. 20, 1955

2,728,036

ELECTRIC CONDENSERS

Ernst Steiner and Kornelius Noss, Heidenheim, and Karl Dauner, Heldenfingen (Kreis), Heidenheim, Germany, assignors to Siemens & Halske, Aktiengesellschaft, Berlin-Siemensstadt and Munich, Germany, a German corporation Application October 20, 1950, Serial No. 213,223
In Germany October 1, 1948

Public Law 619, August 23, 1954
Patent expires October 1, 1968

5 Claims. (Cl. 317—260)

This invention relates to electrical capacitors and is particularly concerned with wrapped capacitors.

Electrical capacitors, especially of the wrapped type, are self-healing if at least one coating is made so thin that it will vaporise or burn upon breakdown and thus interrupt the passage of current between the two coatings before the capacitor is destroyed. This effect is obtained, for example, in paper capacitors comprising a carrier member consisting of paper and serving as dielectric, by providing on such paper carrier very thin metallic coatings, for example by vaporisation. With such condensers, it is relatively simple to apply the terminals or leads, while maintaining the self-healing property, because the coatings may be staggered, so that only one coating is accessible for contact-making at the end faces of the capacitor.

The circumstances are obviously much more difficult in the so-called varnish capacitors, in which the dielectric, formed by a thin layer of varnish, does not serve as a carrier member, but is supported by one of the metal plates.

The term "varnish" is intended to include any suitable substance that may be applied, generally in a liquid form, especially a synthetic substance which is capable of forming a thin dielectric layer on the metal layer to which it is applied.

The object of the invention is to provide self-healing varnish capacitors, either of the laminated or of the wrapped type.

According to the invention, at least one metal coating or plate of the capacitor is made so thin that it rapidly vaporises or burns on breakdown and thus interrupts the passage of current before the capacitor is destroyed.

The leads or terminal contact means of this capacitor are so designed that the self-healing property thereof is maintained, this being done in accordance with the present invention by providing between the plate carrying the layer of varnish and those parts of the lead of the other coating which are not capable of regeneration an insulation whose breakdown strength lies above the maximum breakdown voltage of the capacitor.

The varnish capacitors according to the present invention can be divided into two distinct fundamental constructional forms. In one form, the carrier member is formed by a metal foil, serving as one plate of the condenser, which is, however, too thick to vaporise rapidly enough on puncturing so as to regenerate the condenser. The second plate is therefore made sufficiently thin in to regenerate the capacitor on puncturing. Only a very thin metal layer is therefore applied, for example by vaporisation or by pressure, to the layer of varnish applied to the metal carrier member and serving as dielectric, so that the such thin metal layer regenerates the capacitor on puncturing.

The second constructional form of the varnish foil condenser, which differs fundamentally from the first, provides, in accordance with the present invention, a thin metallised insulating layer serving a carrier member, the thickness of this metallising layer being sufficiently small to meet requirements as regards the regenerating property. The regenerating property of the corresponding capacitor is thus determined by the thin metal layer on the insulating carrier member, and it is therefore obviously not essential to make the second layer as thin as in the construction comprising a metal carrier member. However, for the purpose of increased safety, it is advisable in this construction to apply to the layer of varnish, for example by vaporisation, only a very thin metal coating which is regenerated on breakdown.

Figure 1:
Fig. 1 illustrates in diagrammatic sectional view a form of the invention in which the carrier member is a relatively thick metal plate.

Figure 1 shows a section, on an enlarged scale, through a foil having a relatively thick metal plate 1, for example of aluminum, serving as a carrier member for a layer of varnish 2 serving as the dielectric, which is applied to the metal plate 1. The second coating is formed by a layer of metal 3, which may be applied, for example, to both sides of the varnish by vaporisation. The metal layer 3 is so thin that it assures the regenerating property of the capacitor.

If a foil having a cross-section such as that shown in Figure 1 is employed to form a wrapped capacitor, the application of a terminal contact obviously affords difficulties, because if a metallic connecting strip such as shown in dotted lines in Figure 1 is placed on the metal layer 3, and the structure is wrapped to form the capacitor, the regenerating property is obviously lost due to the thickness of the terminal strip. In the event of breakdown, at this point, neither the metal plate 1 nor the inserted contact strip can vaporise. The current between the plate 1 and the contact strip remains and destroys the capacitor. According to the present invention, this is avoided by introducing a strip of insulating material, for example a fold of a suitable paper or the like, provided with a thin metal layer, in such a manner that it establishes by means of such metal layer, contact between the thin layer of metal 3 and the terminal member, for example, a contact lug introduced into the paper fold. The thickness of the layer of metal and the metal layer of the insulating strip must be so small that the two together are sufficiently thin to vaporize upon breakdown.

Figure 2:
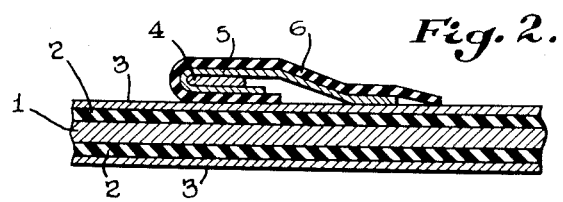
Figs. 2 and 3 show in similar representation examples of the use of terminal means in conjunction with the structure indicated in Fig. 1.
Figure 3:
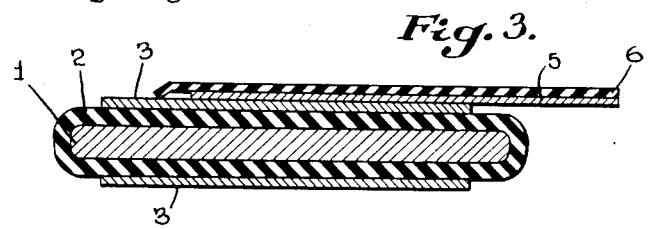

Two examples of the present invention are diagrammatically shown on an enlarged scale in Figures 2 and 3. This foil is formed by the metal plate 1 serving as a carrier member to which is applied the layer of varnish 2 acting as the dielectric, which in turn carries a thin metal layer 3. In the embodiment shown in Figure 2, the terminal 4 is introduced into folded paper 6 carrying a metallic layer 5, that it establishes perfect electrical contact with the thin metallic layer 5 and through such layer 5 with the layer of metal 3 of the condenser.

In the embodiment shown in Figure 3, only the insulating strip 6 having a thin metal layer 5 is introduced into the capacitor, transversely in relation to the longitudinal direction of the foil. Here again, the layer of metal 3 is only connected through the metal layer 5 to the lead (not shown), which is disposed in any suitable manner outside the foil layers, that is to say, outside the wrapped structure.

Figure 4:
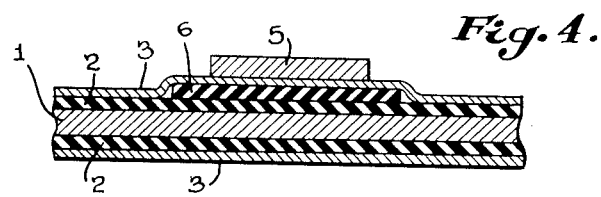
Figs. 4 and 5 show in longitudinal and plan views, respectively, other forms of terminal means that may be employed in the structure shown in Fig. 1.
Figure 5:
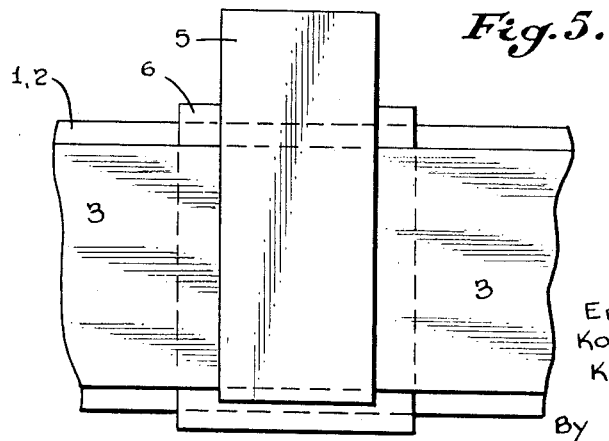

A further embodiment of the present invention is shown in Figures 4 and 5, in which Figure 4 is a longitudinal section and Figure 5 is a plan view thereof. Referring to Figures 3 and 4, a metal carrier member 1 is provided evenly on both sides with a layer of varnish 2. At the point at which the contact is to be made, the layer of varnish is reinforced by an insulating strip 6 applied, for example, by adhesive or by pressure. The second coating 3 of the condenser is then applied to the layer of varnish 2, so that the distance between the two layers at the contact-making point is substantially larger, owing to the insulating strip 3, than at the points where there are no contacts. Breakdown will therefore always occur at the points where only the layer of varnish 2 lies between the elements 1 and 3, but not at the contact-making points, where the layer of varnish 2 is reinforced by the insulating strip 6. It is possible to replace the additionally introduced insulating strip 6 at the contact-making point by a varnish of high disruptive strength, without departing from the principle of the present invention.

In all the constructions shown in Figures 2 to 5, the metal carrier member may be contacted, for example, by removing the layer of varnish at the ends thereof and contact can then simply be made at the points of the metal carrier thus exposed. The contacting can also readily be effected after removing the varnish at the end faces of the wrapped structure.

Figure 6:
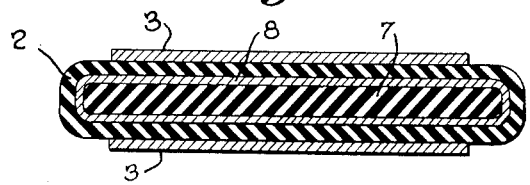
Fig. 6 shows in sectional view a carrier plate of insulating material provided with a metallic self-healing layer, a varnish layer being applied to the metallic layer forming the dielectric to which are applied the other metallic layers.

The metal plate 1 may, in accordance with the present invention, be replaced by a foil of insulating material which is preferably provided on both sides with a thin layer capable of regeneration. This layer serves, as in the examples already shown, to form one coating of the capacitor. The cross-section of the condenser foil thus formed is shown in Figure 6, in which 7 is a plate of insulating material provided on both sides with the metal layer 8 and taking the place of the aluminum plate 1 shown in Figures 2 to 5. There is again applied to the metal layer 8 a layer of varnish 2 acting as dielectric, which in turn again carries the second metallic layer 3. The metal coating 8 may be made sufficiently thin, to cause it to vaporize on breakdown so as to interrupt the passage of current even if for any reason the metal coating 3 is not destroyed rapidly enough by the breakdown current.

Figure 7:
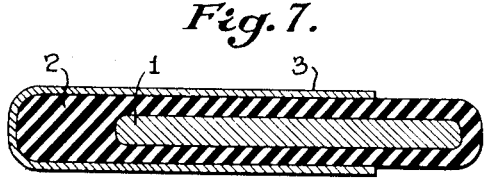
Fig. 7 shows in sectional view a metallic carrier member provided with a varnish layer extending beyond the edge of the carrier member, the second self-healing layer being provided on the varnish layer for direct contacting.

A further constructional form of a condenser according to the present invention, having a metal carrier member not capable of regeneration, is shown in sectional view in Figure 7. Numeral 1 is a metallic carrier member, which is varnished on both sides. The particular feature of this embodiment resides in the fact that the layer of varnish 2 applied extends beyond at least one edge of the metal carrier member 1 to a distance substantially greater than the thickness of the dielectric. The second layer 3 consists of a metallic layer applied to the varnish layer 2 on both sides of the thickened varnish edge (that is, the left-hand edge in Figure 7), leaving the other edge free with a certain clearance. Obviously, with this constructional form satisfactory contact can readily be made on one end face of the capacitor formed from such a foil, by providing the end face formed by the widened varnished edges of the wrapped structure, carrying the metal layer 3, with a cap-like metal layer, for example by spraying. Such metal layer will be electrically connected in a perfectly satisfactory manner to those parts of the metal layers 3 which extend along the widened edge of the varnish, and terminals, for example suitable wires can be soldered thereto. The contact with the metal plate 1 can be provided at the other end by removing the varnish along the corresponding edges of the plate 1 and providing the face formed thereby with a similar strong cap-like metal layer, in suitable manner, for example, by spraying, tinning or by means of supersonic frequency.

Figure 8:
Figs. 8 and 9 indicate constructional forms in which metallized foils of insulating material serve as carrier members.
Figure 9:
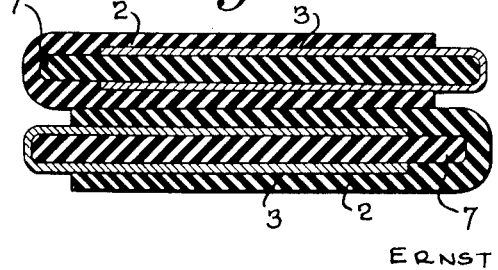

Two further constructional forms of the varnish plate capacitor are shown in Figures 8 and 9. In these embodiments, metallized foils of insulating material serve as carrier members, but these are not metallized on all sides as shown in Figure 6 but have one metal-free edge. The layer of varnish applied to this carrier member extends along both sides the non-metallized edge and leaves the metallized edge of the insulating carrier member free.

In Figure 8, numeral 7 indicates a plate of insulating material. The layer of metal 3 applied thereto extends from one edge of the carrier member, namely the right-hand edge, stopping short of the left-hand edge. The layer of varnish 2 applied leaves the right-hand edge free and is preferably disposed at a distance therefrom. The second coating 9 applied to the layer of varnish 2 extends from the other edge, namely the left-hand edge in Figure 8 and stops short of the right-hand edge. It is thus obviously simple, as in the structure shown in Figure 7, to contact at the end faces of a capacitor formed from these layers, since one coating is accessible for contact making at one end face and the other coating at the other face.

A particular constructional form of the varnish foil capacitor is shown in Figure 9, the nature of which will readily be appreciated from the drawings. Here again, the insulating carrier members 7, have metal layers 3 applied thereto and also varnish layers 2. This capacitor is formed of two plates, each of which carries only one layer of metal 3. These metal layers are so applied that one layer is accessible for contact-making at one end or face of the capacitor and the other metal layer is accessible at the other end or face thereof.

In the two embodiments shown in Figures 8 and 9, the layers 3 and 9 are so thin that they prevent destruction of the condenser in the event of breakdown. These metal layers also leave opposite edges free, preferably with such great clearance that sparking over between them and the strong metal layers applied to the end faces for contact-making cannot occur.

The invention is not limited to the features precisely as shown in the drawings. For example, it is not necessary for the layer of varnish to surround the edge of the carrier members with the same thickness as along the remaining portions thereof which extend along the sides of the carrier member, as is repeatedly shown in the figures, especially as such an even application of varnish at the edge can be obtained only with difficulty. In practice, the edge is not always perfectly varnished, but this is obviously immaterial to the invention because the contact-making is not effected at these edge parts, but only where, owing to the construction according to the invention, no sparking-over can occur in the event of excessive voltage arising at the condenser.

What we claim is:

1. In a self-healing electrical capacitor having elements wrapped upon themselves for capacitive coaction, said elements comprising a carrier member, a varnish coating disposed on either side of said carrier member in parallel therewith and embracing one edge thereof, said varnish coating constituting the dielectric of said capacitor and forming along said edge a portion having a thickness which exceeds the thickness of such coating on either side of said carrier member, a self-healing metallic layer disposed on and extending in parallel with said varnish coating on either side of said carrier member and embracing said thickened varnish portion along said edge, terminal contact means in conductive engagement with said self-healing layer at an area coinciding with the part thereof which embraces said thickened varnish portion, and terminal contact means in conductive engagement with said carrier member, the dielectric strength being increased by said thickened varnish portion to secure the self-healing properties of said metallic layer disposed on the varnish coating on either side of said carrier member.

2. In a self-healing electrical capacitor having elements wrapped upon themselves for capacitive coaction, said elements comprising a metallic carrier member forming one pole of said capacitor, a varnish coating disposed on either side of said carrier member in parallel therewith and embracing one edge thereof, said varnish coating constituting the dielectric of said capacitor and forming along said edge a portion having a thickness which exceeds the thickness of such coating on either side of said carrier member, a self-healing metallic layer disposed on and extending in parallel with said varnish coating on either side of said carrier member and embracing said thickened varnish portion along said edge, said metallic layer forming the other pole of said capacitor, terminal contact means in conductive engagement with said self-healing layer at an area coinciding with the part thereof which embraces said thickened varnish portion, and terminal contact means in conductive engagement with said metallic carrier member, the dielectric strength being increased by said thickened varnish portion to secure the self-healing properties of said metallic layer disposed on the varnish coating on either side of said metallic carrier member.

3. In a self-healing electrical capacitor having elements wrapped upon themselves for capacitive coaction, said elements comprising a metallic carrier member forming one pole of said capacitor, a varnish coating disposed on either side of said carrier member in parallel therewith and embracing one edge thereof, said varnish coating constituting the dielectric of said capacitor and forming along said edge a portion having a thickness which exceeds the thickness of such coating on either side of said carrier member, a self-heating metallic layer embracing said thickened varnish portion along said edge and extending therefrom along the sides of said varnish coating on either side of said metallic carrier member to a point laterally spaced from the opposite edge thereof, said metallic layer forming the other pole of said capacitor, terminal contact means in conductive engagement with said self-healing layer at an area coinciding with the part thereof which embraces said thickened varnish portion, and terminal contact means in conductive engagement with said metallic carrier member, the dielectric strength being increased by said thickened varnish portion to secure the self-healing properties of said metallic layer disposed on the varnish coating on either side of said metallic carrier member.

4. In a self-healing electrical capacitor of the wrapped type having elements wrapped upon themselves for capacitive coaction, said elements comprising a relatively thick striplike metallic member forming a carrier and constituting one pole of said capacitor, an insulating varnish coating constituting the dielectric disposed on either side of said carrier and extending laterally therefrom beyond one edge thereof to form at such edge a widened dielectric portion of a width which exceeds the thickness of the varnish coating on either side of said carrier, a relatively thin metallic layer disposed on said varnish coating on either side of said carrier, said metallic layer constituting the other pole of said capacitor and embracing said widened dielectric portion at said one edge of said carrier and extending along said varnish coating toward and laterally spaced from the other edge of said carrier, and a metallic terminal contact member disposed at each end face of said condenser in conductive engagement respectively edgewise with said metallic layer at one end face and edgewise with said carrier at the opposite end face, said widened dielectric portion formed by said varnish coating at said one edge of said carrier forming an area of increased breakdown strength to compel breakdown discharge along portions of said metallic layer extending toward said other edge of said carrier.

5. In a self-healing capacitor having elements wrapped upon themselves for capacitive coaction, said elements comprising a carrier member, a varnish coating disposed on either side of said carrier member in parallel therewith and extending laterally beyond one edge thereof for a distance which exceeds the thickness of such coating on either side of said carrier member to form along such edge a thickened varnish portion, said varnish coating constituting the dielectric of said capacitor, a self-healing metallic layer disposed on and extending in parallel with said varnish coating on either side of said carrier member and including said thickened varnish portion along said edge, terminal contact means in conductive engagement with said self-healing layer at an area coinciding with the part thereof which forms said thickened varnish portion, and terminal contact means in conductive engagement with said carrier member, the dielectric strength being increased by said thickened varnish portion to secure self-healing properties of said metallic layer disposed on the varnish coating on either side of said carrier member.

References Cited in the file of this patent

UNITED STATES PATENTS

| | | |
|---|---|---|
| 2,463,765 | Grouse | Mar. 8, 1949 |
| 2,593,829 | Arledter | Apr. 22, 1952 |

FOREIGN PATENTS

| | | |
|---|---|---|
| 562,821 | Great Britain | July 18, 1944 |